March 25, 1941.     T. SONNENTAG     2,236,015

HOMING IMPULSE DIRECTION FINDER

Filed Sept. 10, 1938

Inventor
Theodor Sonnentag
By
Attorney

Patented Mar. 25, 1941

2,236,015

UNITED STATES PATENT OFFICE 2,236,015

HOMING IMPULSE DIRECTION FINDER

Theodor Sonnentag, Berlin, Germany, assignor to Telefunken Gesellschaft für Drahtlose Telegraphie m. b. H., Berlin, Germany, a corporation of Germany Application September 10, 1938, Serial No. 229,259
In Germany August 28, 1937

3 Claims. (Cl. 250—27)

Direction-finding by the impulse method, whether by the aid of a Braun tube or by the principle underlying the so-called homing or target-bearing principle, is predicated upon the resolution of the incoming ground (direct) and space (indirect or sky) wave impulses and the use of receivers designed for wide bands. In what follows a method shall be disclosed which is adapted to the use of receiver equipment designed for narrow bands.

It is known in the art that ground wave and space wave impulses may be sorted or separated by utilizing the difference in time required for the travel or propagation of the electromagnetic waves. For instance, a Braun tube may be used upon the screen of which the patterns or tracings due to the ground wave and the sky wave impulses may be shown separately. In order to allow acoustic direction-finding by the impulse method, it has been suggested in the earlier art to periodically open and block the receiver at such a rhythm or rate that only the ground-wave impulses will be registered and indicated. Inasmuch as synchronization for the regulation of the receiver sensitiveness and response for the incoming impulses is required, it will be seen that this method is unserviceable and unsuited in an impulse-type direction-finder which operates by the conventional minimum signal method. For this reason, the further suggestion has been made to construct an impulse direction-finder apparatus which is predicated for its operation upon the so-called homing or target-bearing principle. For this purpose, a frame antenna and an auxiliary antenna are provided. The input potential of one of these two antennae is reversed periodically at a certain rhythm or rate. If visual (bearing) indication is demanded it is necessary to provide ways and means insuring a change-over of the receiver output circuit acting upon the indicater or reading instrument in synchronism with the antenna reversals. Periodic opening (unblocking) and blocking of the receiver set is attended both with technical as well as economic disadvantages.

The present invention, therefore, discloses a method for direction-finding based upon the homing or target-bearing principle, the outstanding feature of which is that the steepness of slope of the rising portion or stroke of the ground or direct wave impulse is measured, and that the said slope is utilized for a comparison of the amplitudes of the ground-wave impulses in the two positions of the diagram.

Figure 1:
Figure 2:
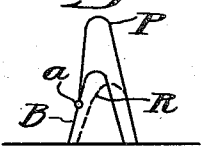
Figure 3:
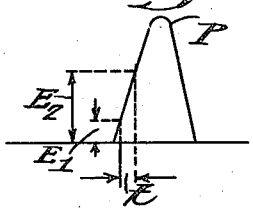
Figure 4:
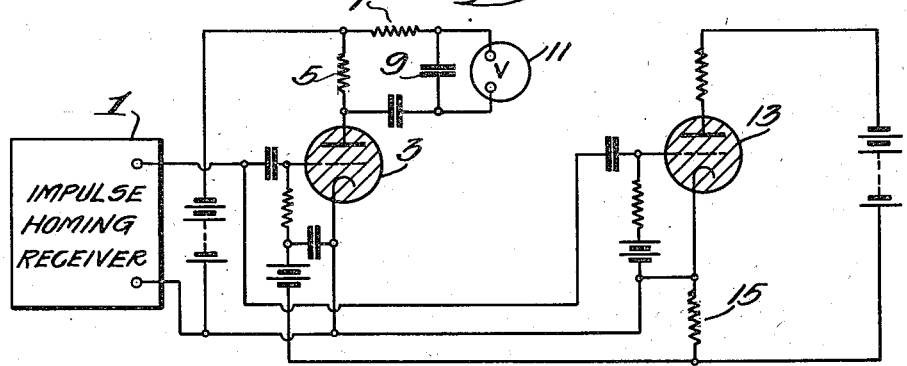
Figure 5:
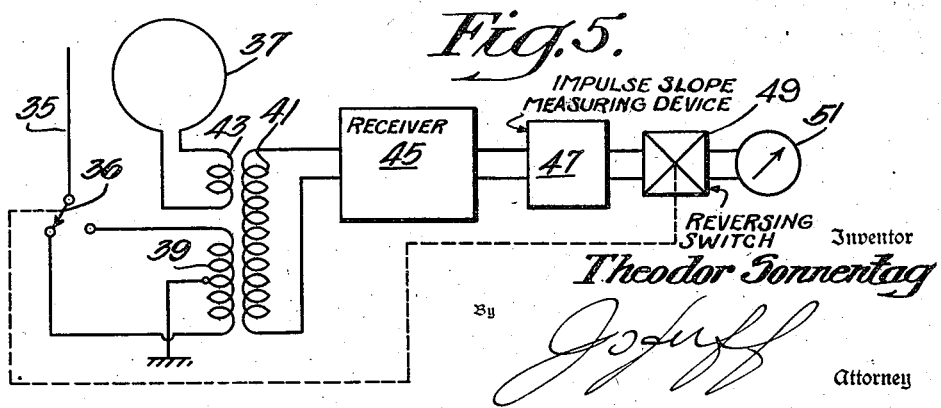

The invention will be described by referring to the accompanying drawings in which Figs. 1 to 3 are diagrams for illustrating the principle of operation of the invention; Fig. 4 is a schematic circuit diagram of an embodiment of the invention; and Fig. 5 is a schematic diagram of the circuit of the invention applied to a homing impulse receiver.

The idea underlying the invention is based upon certain facts to be described in more detail by reference to Figs. 1 to 3. In the case where the distance between transmitter and receiver is small, ground-wave impulses B and sky or space-wave impulses R will appear separate in the receiver, as shown in Fig. 1. If the distance is great, the sky-wave impulse R will reach the receiver at an instant when the received ground-wave impulse B will not have entirely died out. The result will be a resultant impulse P as shown in Fig. 2. The rising side or up stroke of the ground-wave impulse B as far as the point marked $a$, however, will at all events be preserved. Now, since the slope or steepness of the up-strokes is a measure and criterion for the amplitude of the ground-wave impulse, it is possible to make comparisons in line with the homing principle by measuring the rising, up-stroke of the ground-wave impulse.

The steepness of the up-stroke of the ground-wave impulse, for instance, may be measured by different ways and means. One method illustrated in Fig. 3 is to measure the time $t$ during which the ground-wave impulse passes through two predetermined constant potentials $E_1$ and $E_2$.

In what follows an exemplified embodiment shall be described by reference to Fig. 4 in the case where the slope of the up-stroke is determined by measuring the time $t$. According to Fig. 4, the output potential of an impulse homing receiver 1 is impressed upon the grids of two tubes, more particularly "Thyratrons" 3 and 13. In the plate circuit of the "Thyratron" 3 is included a condenser 9 in parallel relation to a resistance 5, the said condenser 9 being charged through the resistance 7. Across the terminals of the condenser 9 is connected a voltmeter 11. While the "Thyratron" 3 discharges in the presence of a receiver output potential $E_1$, the "Thyratron" 13 should discharge in the presence of a receiver output potential $E_2$.

The function of the arrangement is as follows: As stated, the "Thyratron" 3 discharges at the instant the up-stroke of the ground-wave impulse attains the voltage level $E_1$. As a result, a current flows through the plate circuit of the "Thyratron" 3 with the consequence that a constant fall of potential arises across the resistance 5. This fall of potential results in the charging of the condenser 9 according to a curve conditioned by the time-constant of 7, 9. At the instant when the up-stroke of the impulse has attained voltage $E_2$, "Thyratron" 13 discharges, and a current is caused to flow in the plate circuit thereof. The voltage arising as a result across the resistance 15 impresses a biasing potential upon the grid of the "Thyratron" 3 which is of sufficient amplitude to stop the discharge of the "Thyratron" 3. Hence, condenser 9 could be charged only up to this instant so that the reading instrument 11 (voltmeter) associated with condenser 9 furnishes a measure and criterion for the time $t$ indicated in Fig. 3. Since the said time, with $E_1$ and $E_2$ fixed, is a measure for the slope of the up-stroke of the impulse, the instrument deflection is inversely proportional to the amplitude of the ground-wave impulse that happens to be picked up.

Fig. 5 illustrates the principle of the homing receiver in which has been incorporated the circuit organization here disclosed. Such a homing receiver (target-bearing receiver) using impulses comprises a vertical antenna 35 which by the agency of a reversing switch 36 is connected at will in one sense or the other with the coil 39 in coupling relation with the receiver equipment. The directional or frame aerial 37, through the intermediary of coil 43, is also coupled with the coupling coil 41 of the receiver apparatus 45. The output of receiver 45 is fed to an arrangement schematically indicated at 47 which may correspond to an arrangement as shown in Fig. 4. The output terminals of the arrangement 47 adapted to measure the steepness of the slope or up-stroke of the impulse are connected with a change-over or reversing switch 49 which operates in synchronism with the change-over switch 36. It is with this change-over switch that the visual indicator or reading instrument is associated.

The invention is not confined to the use of "Thyratron" type tubes. As a matter of fact, other kinds of electronic tubes may be employed whose biasing voltage is altered in a way as hereinbefore illustrated. It is moreover evident that in the impulse homing receiver as shown in Fig. 5 reversal of the frame or loop may be effected in lieu of the reversal of the vertical antenna.

The method disclosed in the present invention furthermore is not confined to impulse direction-finding systems working on the target-bearing or homing principle. In fact, as a general rule, it is suited for a measurement or for a comparison of radio impulses. Comparisons of this kind may be required, for instance, whenever it is necessary to ascertain or read distances from the intensity of incoming radio impulses.

I claim as my invention:

1. The method of visually indicating the reception of an impulse from an impulse type of transmitter which includes initiating an electrical discharge when said received impulse reaches a predetermined amplitude, initiating a second electrical discharge when said received impulse reaches a second predetermined amplitude, extinguishing said first discharge by application of said second discharge, and indicating the time between said predetermined amplitudes.

2. The method of visually indicating the reception of an impulse from an impulse type of transmitter which includes initiating an electrical discharge when said received impulse reaches a predetermined amplitude, stopping said discharge when said impulse reaches a second predetermined amplitude, deriving a voltage the amplitude of which is a function of the time between the occurrence of said predetermined amplitudes, and observing the amplitude of said voltage.

3. The method of visually indicating the reception of an impulse from an impulse type of transmitter which includes initiating an electrical discharge when said received impulse reaches a predetermined amplitude, initiating a second discharge when said impulse reaches a second predetermined amplitude applying said second discharge to extinguish said first discharge, deriving a voltage the amplitude of which is a function of the time between the occurrence of said predetermined amplitudes, and observing the amplitude of said voltage.

THEODOR SONNENTAG.